US010420441B1

(12) United States Patent
Pugh

(10) Patent No.: US 10,420,441 B1
(45) Date of Patent: Sep. 24, 2019

(54) WATER BAGEL COOKWARE AND METHOD

(71) Applicant: Charles Vernon Pugh, Longmont, CO (US)

(72) Inventor: Charles Vernon Pugh, Longmont, CO (US)

(*) Notice: Subject to any disclaimer, the term of this patent is extended or adjusted under 35 U.S.C. 154(b) by 0 days.

(21) Appl. No.: 16/127,537

(22) Filed: Sep. 11, 2018

(51) Int. Cl.
| | |
|---|---|
| *A47J 36/20* | (2006.01) |
| *A21D 13/40* | (2017.01) |
| *A21C 14/00* | (2006.01) |
| *A47J 36/02* | (2006.01) |
| *A47J 37/10* | (2006.01) |
| *A47J 45/07* | (2006.01) |
| *A47J 45/10* | (2006.01) |

(52) U.S. Cl.
CPC .............. *A47J 36/20* (2013.01); *A21C 14/00* (2013.01); *A21D 13/40* (2017.01); *A47J 36/025* (2013.01); *A47J 37/108* (2013.01); *A47J 45/07* (2013.01); *A47J 45/10* (2013.01)

(58) Field of Classification Search
CPC .......... A47J 36/20; A47J 36/025; A47J 36/16; A47J 36/18; A47J 36/22; A47J 36/24; A47J 36/2405; A47J 36/2411; A47J 37/108; A47J 45/06; A47J 45/065; A47J 45/066; A47J 45/063; A47J 45/07; A47J 45/071; A47J 45/074; A47J 45/075; A47J 45/077; A47J 45/10; A47J 47/14; A47J 47/16; A47J 47/20; A47G 2400/08; A47G 23/0641; A47G 9/00; A47G 43/20; A21C 14/00; A21D 13/40; Y10T 403/7007; A47B 75/00; A47F 7/0071

USPC ...... 211/85.4, 125, 126.1; 99/448, 354, 426, 99/442; 16/422; 220/318, 319; 403/349
See application file for complete search history.

(56) References Cited

U.S. PATENT DOCUMENTS

| | | | | |
|---|---|---|---|---|
| 536,986 | A * | 4/1895 | Dunlap ................ | A47J 37/047 99/409 |
| 745,196 | A * | 11/1903 | King et al. ............. | A47J 29/06 211/181.1 |
| 820,792 | A * | 5/1906 | Kelly .................. | A47J 37/1295 220/318 |
| 1,205,522 | A * | 11/1916 | Doerr et al. ............ | A21B 3/13 211/85.4 |
| 1,548,242 | A * | 8/1925 | Anderson ............... | A47J 29/06 99/440 |
| 1,565,077 | A * | 12/1925 | Finn ................... | A47J 37/0694 206/525 |
| 1,630,188 | A * | 5/1927 | Knauff ............... | A47J 37/0694 99/419 |

(Continued)

*Primary Examiner* — Jennifer E. Novosad
(74) *Attorney, Agent, or Firm* — Patent Law Offices of Rick Martin, P.C.

(57) ABSTRACT

A bagel cookware comprises a round bagel tray sized to hold about four bagels in a twelve inch pot of boiling water. The bagel tray has about four vertical bagel support rods and a central socket comprising a cylindrical collar. This cylindrical collar has a pair of vertical slots to receive a T bar end of a lifting handle. When the handle is twisted the T bar end engages a pair of retainer channels. The handle also has a series of anti-floatation screens so the bagels cannot float while boiling. The chef can use the removable handle to place the cookware in boiling water, then pick up the cookware and place it in an oven. Commercial embodiments could use robotics and hold dozens of bagels on an equivalent apparatus.

13 Claims, 8 Drawing Sheets

(56) References Cited

U.S. PATENT DOCUMENTS

| | | | | |
|---|---|---|---|---|
| 2,362,921 A * | 11/1944 | Palensky | A21B 5/00 | 99/340 |
| 2,576,235 A * | 11/1951 | Nelson | A47J 45/10 | 294/100 |
| 2,655,403 A * | 10/1953 | Ernest | A47J 45/10 | 211/74 |
| 3,143,059 A * | 8/1964 | Sofio | A47J 27/04 | 206/565 |
| 3,379,118 A * | 4/1968 | Perez | A47J 37/0694 | 165/104.21 |
| 3,423,781 A * | 1/1969 | Henson | A47L 13/24 | 15/145 |
| 3,638,583 A * | 2/1972 | Goodier | A21B 3/132 | 249/122 |
| 3,897,162 A * | 7/1975 | Havark | F16B 19/08 | 24/704.1 |
| 3,933,011 A * | 1/1976 | DiGilio | A44C 17/0208 | 63/29.1 |
| 4,138,939 A * | 2/1979 | Feld | A47J 43/24 | 99/418 |
| 4,223,862 A * | 9/1980 | Doughty | A61B 6/04 | 248/222.52 |
| 4,656,928 A * | 4/1987 | Mack | A47J 29/00 | 426/302 |
| 4,853,509 A * | 8/1989 | Murakami | A47J 36/027 | 219/731 |
| 4,943,182 A * | 7/1990 | Hoblingre | F16B 7/20 | 403/325 |
| 5,129,451 A * | 7/1992 | Moir | A47J 37/00 | 165/185 |
| 5,346,268 A * | 9/1994 | Baker | A47J 37/0786 | 294/103.1 |
| 5,456,095 A * | 10/1995 | Tawil | A44C 17/0216 | 24/574.1 |
| 5,682,809 A * | 11/1997 | Harrison | A21B 5/08 | 219/474 |
| 5,685,217 A * | 11/1997 | Kreitzer | A47J 36/027 | 219/725 |
| 5,720,081 A * | 2/1998 | Aquilina | B25G 1/00 | 16/422 |
| 5,934,185 A * | 8/1999 | Sonnier | A47J 36/20 | 211/181.1 |
| 6,065,393 A * | 5/2000 | Lombard | A47J 29/00 | 99/426 |
| 6,126,359 A * | 10/2000 | Dittrich | A61B 17/29 | 403/325 |
| 6,438,784 B1 * | 8/2002 | Yu | A46B 7/04 | 15/105 |
| D479,414 S * | 9/2003 | Sparkowski | D9/456 | |
| 6,742,446 B2 * | 6/2004 | McLemore | A47J 37/1295 | 99/416 |
| 6,823,563 B2 * | 11/2004 | Robinson | E05B 35/008 | 16/422 |
| 7,147,399 B2 * | 12/2006 | Viscount | A63C 19/062 | 403/349 |
| 7,213,292 B1 * | 5/2007 | Tucker | B25G 1/02 | 15/144.1 |
| 7,237,476 B1 * | 7/2007 | Bourgeois | A47J 36/26 | 99/340 |
| 7,984,528 B2 * | 7/2011 | Giacolo | B25G 3/08 | 15/145 |
| 8,245,632 B1 * | 8/2012 | Fields | A47J 29/02 | 99/440 |
| D680,352 S * | 4/2013 | Aiudi | D6/682.4 | |
| 8,540,198 B2 * | 9/2013 | Keyvanloo | A47F 5/0823 | 248/220.21 |
| 8,851,540 B1 * | 10/2014 | Gaulke | A47J 37/0664 | 294/12 |
| 8,915,391 B2 * | 12/2014 | Radow | A47G 19/00 | 108/139 |
| 9,156,140 B2 * | 10/2015 | Stillwagon | B25B 9/00 | |
| 2001/0002521 A1 | 6/2001 | Maniezzo | A47F 5/0823 | 52/27 |
| 2006/0254431 A1 * | 11/2006 | Mariano | A47J 36/20 | 99/415 |
| 2006/0254976 A1 * | 11/2006 | Cooper | A47J 36/20 | 210/470 |
| 2007/0092333 A1 * | 4/2007 | Viscount | A63C 19/062 | 403/349 |
| 2009/0208281 A1 * | 8/2009 | Noh | B60T 11/046 | 403/349 |
| 2013/0111707 A1 * | 5/2013 | Mowry | A47J 45/10 | 16/422 |
| 2016/0135818 A1 * | 5/2016 | Weekes | A61B 17/1666 | 606/80 |
| 2016/0331184 A1 * | 11/2016 | Picken, Sr. | A47J 45/10 | |

* cited by examiner

WATER BAGEL COOKWARE AND METHOD

FIELD OF INVENTION

The present invention relates to first boiling a dough shaped bagel and then baking it using the same cookware.

BACKGROUND OF THE INVENTION

Traditional water bagel methods include using a cookie tray with paper parchment, a pot of boiling water, a strainer spoon and an oven. First the chef makes a round raw bagel dough. Second the chef places several raw bagel doughs onto a cookie tray with a non-stick disposable such as paper parchment. Third the dough rises. Fourth the raw dough bagels are dropped into simmering hot water. Optionally several additives can be added such as sugar. Fifth each bagel is flipped in a time range of about ten seconds to about thirty seconds. That is tricky because the chef must try and keep track of each of perhaps four bagels and how much time has each bagel been in the water. Sixth a strainer spoon is used to remove each bagel. Seventh the bagels are placed on a non-stick pan. Optionally a topping may be added. Eighth the bagels are baked at about 400° F. for a chosen time. Ninth the pan is removed from the oven. Now the bagels are ready to eat.

What is needed in the art is cookware to hold (four) several bagels together during the hot water and baking process to save handling time and solve the problem of uniform boiling and flipping time. The present invention solves these problems with a (stainless steel) two piece cookware. A bottom (circular) tray has poles to place the bagels around. A top handle and anti-float screen is used to place the bagels into the water, out of the water, into the oven and out of the oven.

SUMMARY OF THE INVENTION

The main aspect of the present invention is to provide a multi-bagel pan that has poles to keep the bagels in place during boiling.

Another aspect of the present invention is to provide a handle having an anti-flotation screen for the pan.

Another aspect of the present invention is to allow the handle to be used both for boiling and then in the oven for baking.

Another aspect of the present invention is to provide a removable handle to allow loading/unloading of the bagels.

Another aspect of the present invention is to provide a Teflon® coated stainless steel structure for all the cookware.

Other aspects of this invention will appear from the following description and appended claims, reference being made to the accompanying drawings forming a part of this specification wherein like reference characters designate corresponding parts in the several views.

The basic cookware features are noted below.

| FEATURE | CRITERIA |
| --- | --- |
| 1. Description | 1. Baking tray for bagels |
| | 2. Removable handle |
| | 3. Four hollow posts for bagels to wrap around |
| 2. Requirements | 1. Tray must be able to fit into 12" diameter pot |
| | 2. Tray needs to be small enough to not create pressure when dipped into the pot |
| | 3. Non-stick pan |
| | 4. Removable stainless steel handle |
| | 5. Pan will accommodate for bagel expansion |
| 3. Design | 1. Non-stick pan with 4 hollow posts |

The design consists of a nonstick pan with four bagel posts and a detachable stainless steel handle. The pan is sized to accommodate for the bagel expansion, but also fit easily into the dipping pot without creating too much upwards water pressure. The handle is made from a bent rod and can have two rings welded on to hold the bagels down while under water. The diameter of the tray is about 11.5" to accommodate for the 12" pot. All materials are preferably Teflon® coated stainless steel.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
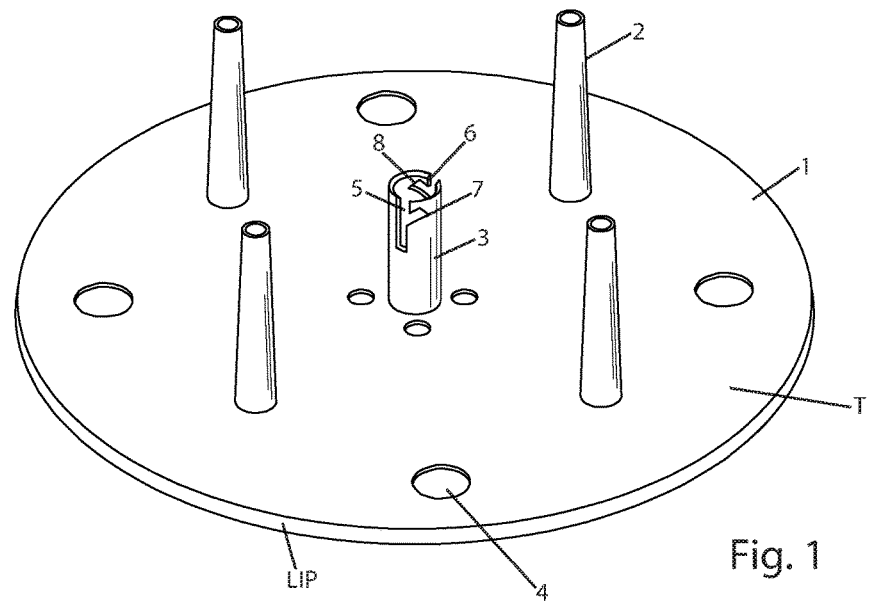
FIG. 1 is a top perspective view of the bagel pan.
Figure 2:
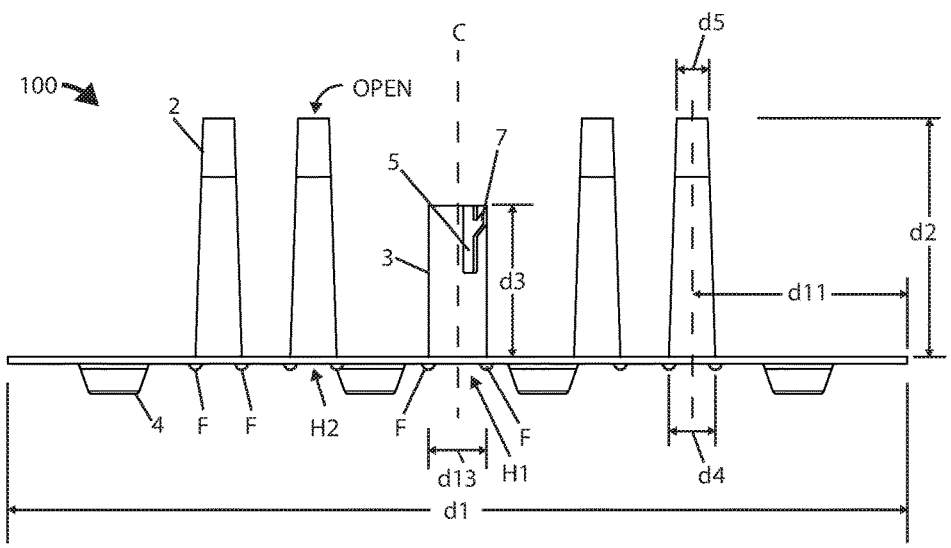
FIG. 2 is a side elevation view of the bagel pan.

Referring first to FIGS. 1,2 the bagel tray 1 (nominally thinner than 0.125 inch for weight and stamped with a rolled peripheral lip LIP) is preferably round to fit in a twelve inch pot of water. The tray 1 could be made from aluminum, SS, coated mild steel, copper or the like. Each bagel post 2 (preferably hollow) is identical and placed a distance d11 from a center of post to the peripheral edge of the bagel tray 1. The top is OPEN, with a water exit hole H2 at each bottom.

The bagel tray 1 has a central axis C. The posts 2 and the top tray 1 are preferably Teflon® coated, or an equivalent anti-stick compound. Mounted on the central axis C is a socket 3. A hole H1 allows water to exit the socket 3. The socket 3 has parallel vertical slots 5,6 which at the upper end diverge into retainer channels 7,8. A plurality of feet 4 keep the bagel tray 1 off the bottom of the pot while boiling. The entire tray 1 is preferably stainless steel with all upper surfaces of the posts and tray Teflon® coated as noted with a "T" marking. Preferably the socket 3 and the bagel posts 2 will fit thru holes H1, H2 and be tack welded at the bottom via the flange F at the bottom of each socket 3 and bagel post 2.

Figure 3:
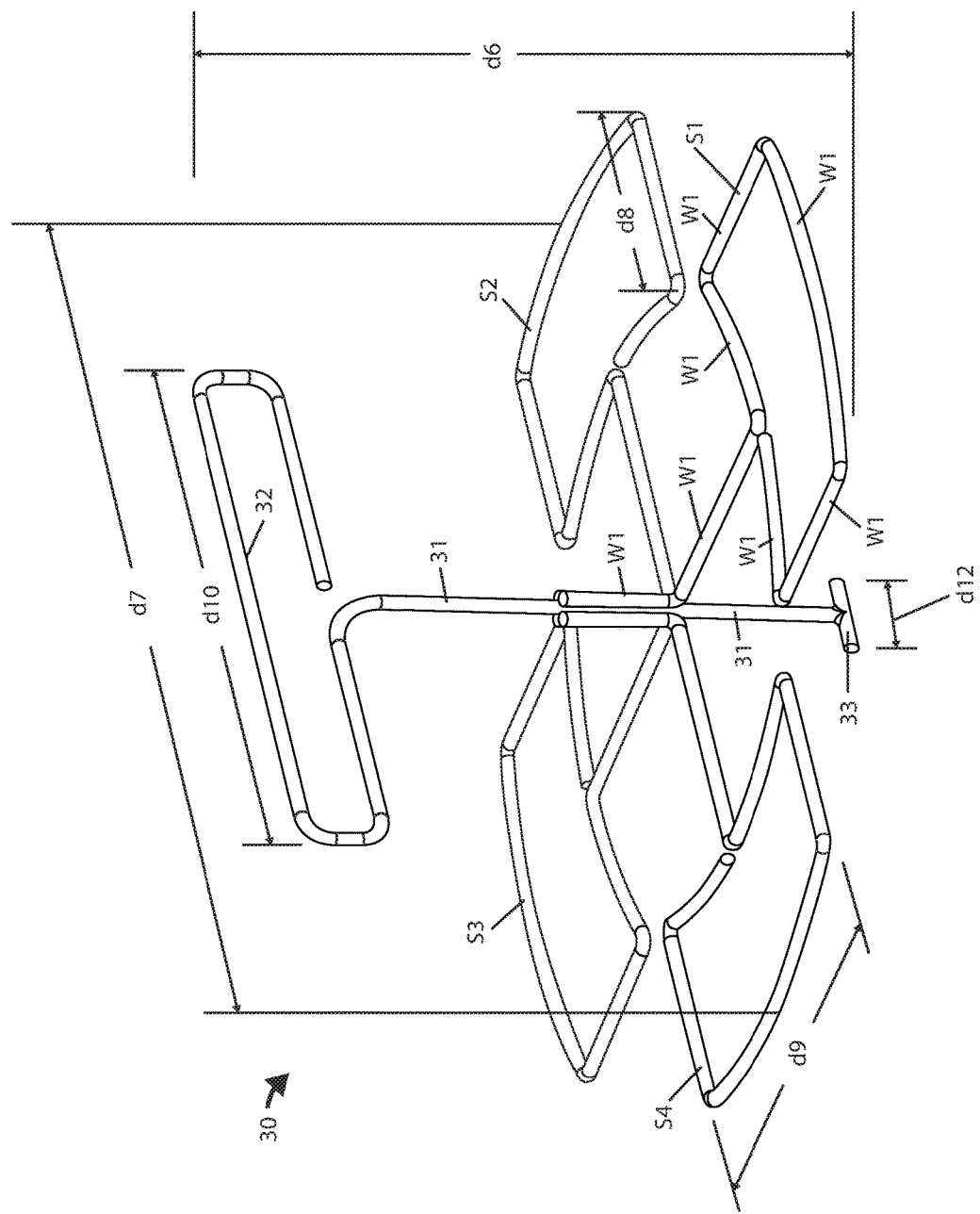
FIG. 3 is a side perspective view of the handle.

Referring next to FIG. 3 the handle 30 is preferably one piece stainless steel Teflon® coated. The wire structure is preferably about one eighth inch in diameter. Not shown is an optional telescoping rod 31 to which the gripper 32 is connected to. The rod 31 ends in a T bar 33. This T bar 33 slides down the parallel vertical slots 5,6 of socket 3. When the T bar 33 is twisted left, it engages the retainer channels 7, 8 so that the bagel tray 1 can be lifted up.

The screen segments S1, S2, S3, S4 are preferably each made of a wire bent into shape as shown by wire W1 forming screen segment S1. Welds can hold the vertical ends of the screen segments against rod 31.

Figure 4:
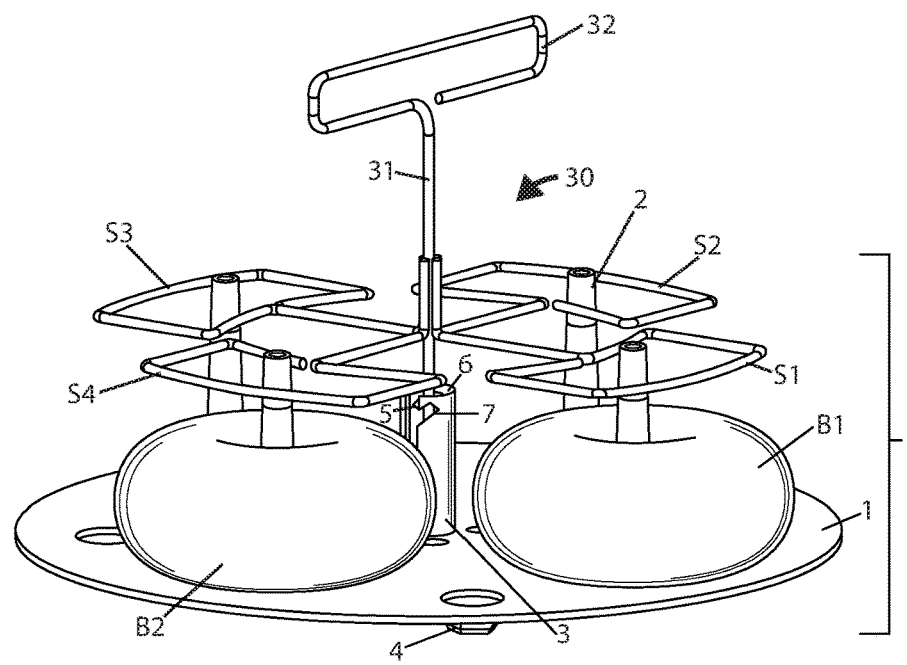
FIG. 4 is a side perspective view of the handle and pan cookware with two bagels onboard.
Figure 5:
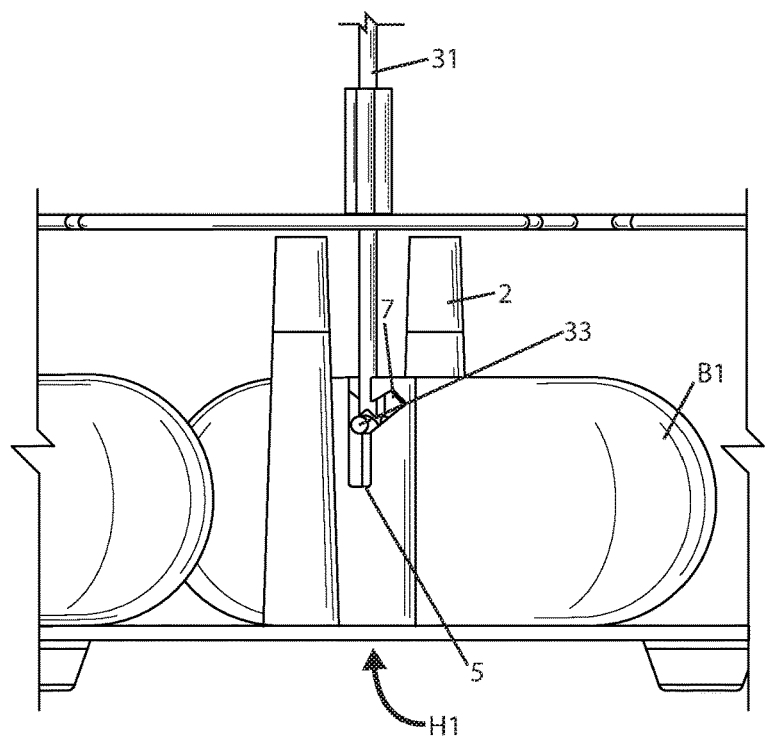
FIG. 5 is a side closeup view of the handle in the detach mode.

Referring next to FIGS. 4,5 the handle 30 is attached to the bagel tray 1 via the T bar 33 engaging vertical slots 5,6. Bagels B1, B2 are resting atop bagel tray 1. When the chef lets go of the gripper 32, the T bar 33 falls to the bottom of vertical slots 5,6. In this rest mode the cookware designated CW could be resting on a table or resting in a pot of hot water or resting in an oven at oven 400° F. The handle 30 is removed from the bagel tray 1 for loading raw dough bagels and unloading cooked bagels.

Figure 6:
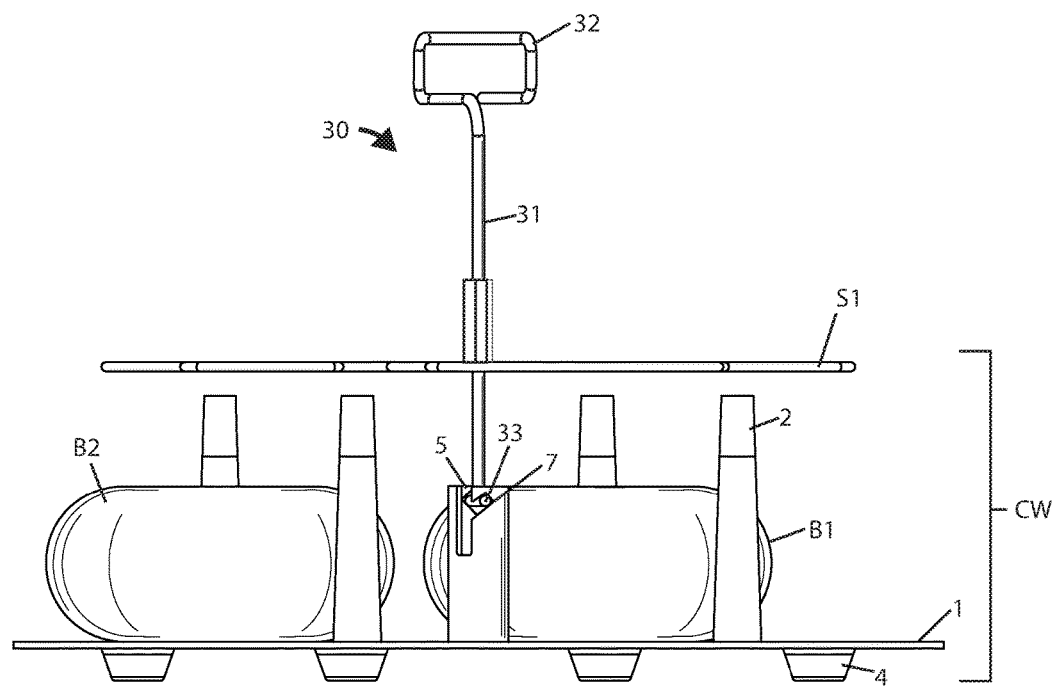
FIG. 6 is a side elevation view of the handle in the lift mode.

In FIG. 6 the gripper 32 has been partially rotated counterclockwise to engage the T bar 33 in retainer channels 7,8. In this locked mode the cookware CW can be lifted and placed where needed.

Nominal dimensions are d1=11.5", d2=3.0", d3=1.5-2.0", d4=0.50", d5=0.25", d6=4.5625", d7=9.10", d8=2", d9=3.875", d10=5.425", d11=1.5", d12=1.0", d13=0.615".

The preferred method of using cookware CW is noted below.

Steps:
1. Place raw dough rings oven four rods 2 on the circular bagel tray 1;
2. Insert handle 30 T bar 33 into socket 3;
3. Twist handle 30 to engage T bar 33 into the retainer channels 7,8;
4. Lift the total assembly CW using gripper 32 and dunk into boiling fluid (water, oil), and chef chooses duration and quantity of water bathing (repeat step 4 with each batch);
5. Adjust oven rack to allow insertion of assembly CW to accommodate height of d6 plus the chef's hand;
6. Pre-heat oven (to about 400° F.) (optionally add topping)
7. Place assembly CW in oven and optionally remove handle 30;
8. Bake a chosen time;
9. Place (cold) handle 30 back into socket 3 and remove baked bagels.
10. Remove handle 30 from socket 3.
11. Remove bagels from bagel tray 1.
12. Eat!

Figure 7:
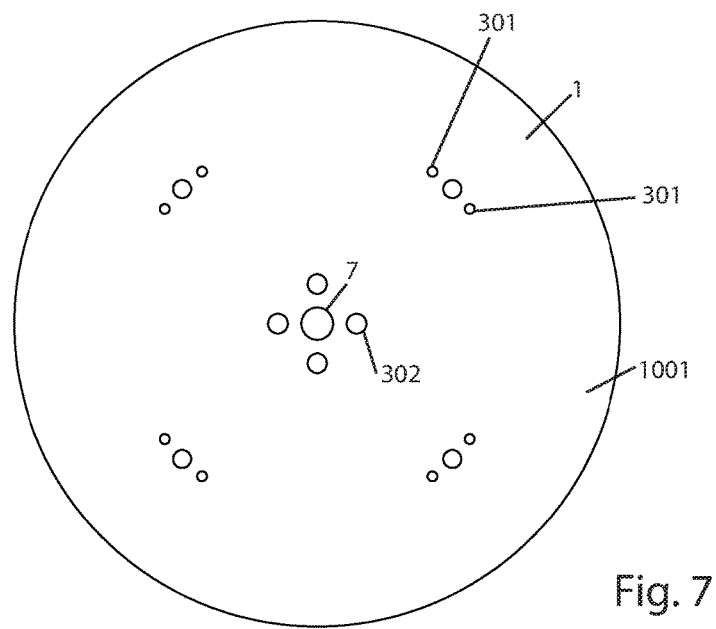
FIG. 7 is a bottom plan view of tray 1.
Figure 8:
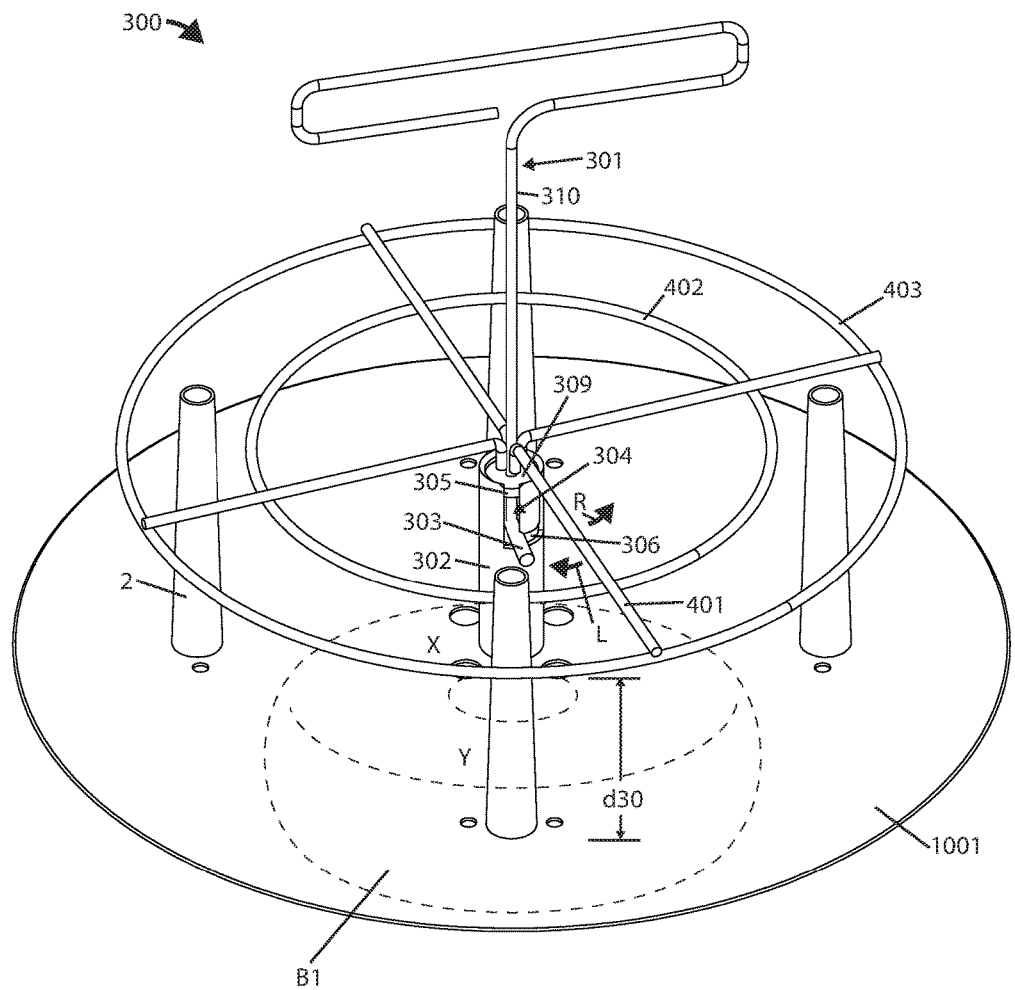
FIG. 8 is a top perspective view of an alternate cookware 300.
Figure 9:
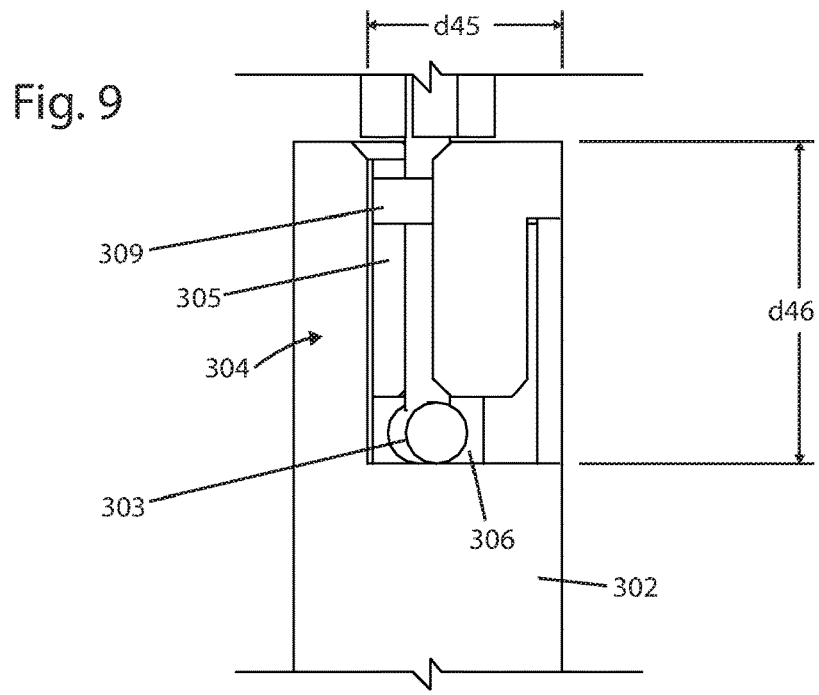
FIG. 9 is a side elevation view of the center port and "L" slot.
Figure 10:
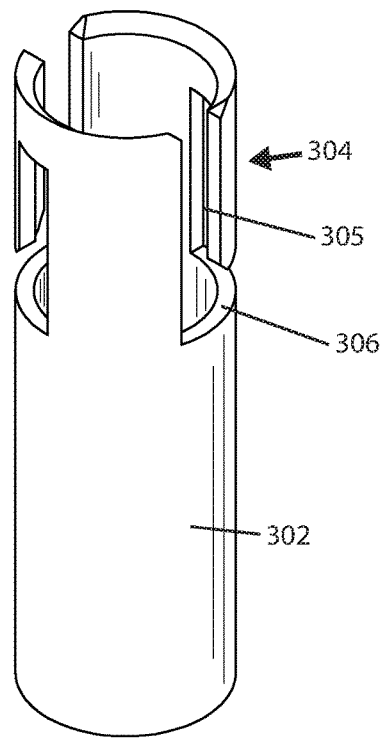
FIG. 10 is a top perspective view of the center post.
Figure 11:
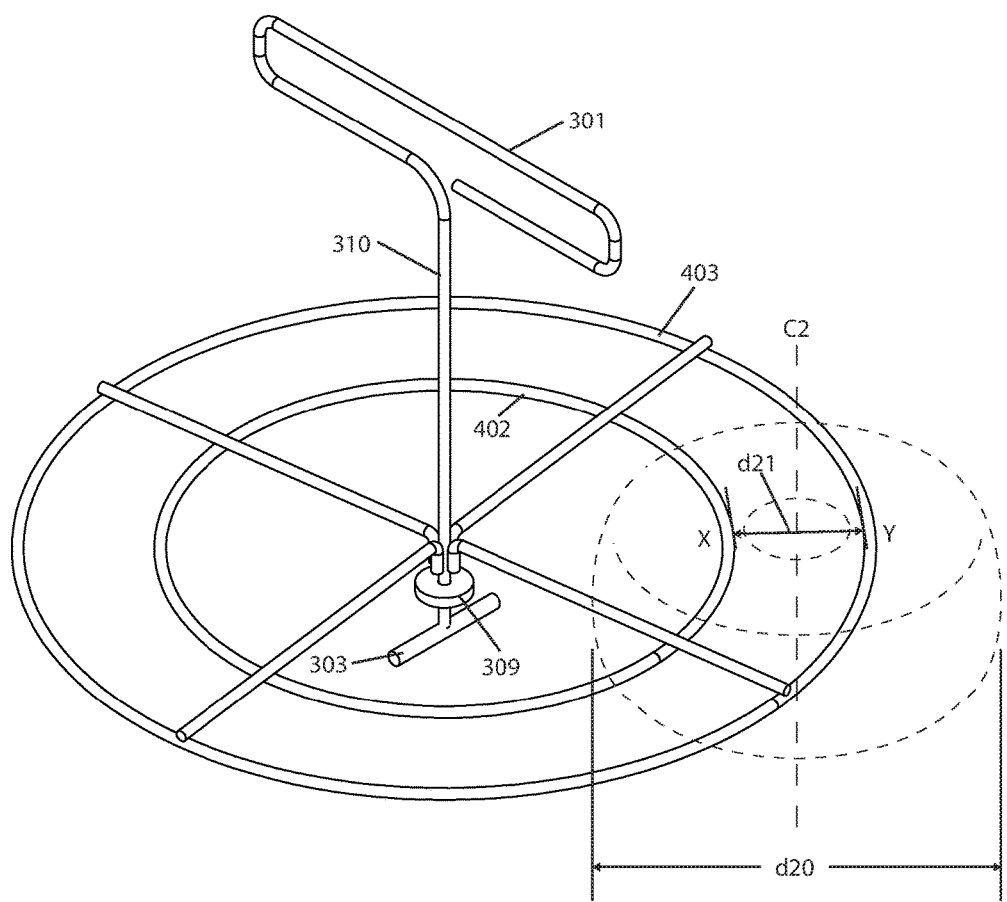
FIG. 11 is a top perspective view of an alternate handle 301.

In FIG. 7 the bottom of tray 1001 shows water drain holes 301 for each post 2 to allow the center of each bagel to drain out the water when lifting. The hollow bottom of each post 2 fits into a hole tightly, and a tack weld may be used.

The socket 333 (also called a center post) is also hollow and fits tightly into its hole. A tack weld may be used. Water drain holes 302 allow easy drainage and lifting. This tray 1001 has no feet, and the bottom is not Teflon® coated.

Referring next to FIGS. 8,9,10,11 the cookware combination of the tray 1001 and handle 301 is designated 300. The center post 333 has an L shaped symmetrical slot 304 for the T shaped arm 303 at the bottom of the handle 301. In operation the arm 303 is placed down the vertical slot (s) 305 of L slot 304. Then the handle 301 is rotated to insert arm 303 into the horizontal slot 306 of the L slot 304. In this engaged position the handle 301 can lift the tray 1001 as well as allow an up and down dunking of the tray 1001 in a pot of water. The washer (metal) 309 prevents the shaft 310 of handle 301 from wobbling in center post 333 during handling.

Arrows left L and R show the rotational movement of the radius arm 401. The design must prevent arm 401 (s) from hitting post (s) 2, which extend above the arm 401 about one half inch. Inner ring 402 should be designed to align with a center of the inner ring denoted X of bagel B, and outer ring 403 should be designed to align with a center of the outer ring denoted Y of bagel B in order to prevent wobbling of the bagel as it tries to float underwater in the pot. The height of each post 2 is about 3.0 to 3.5 inches with the height of the rings 402, 403 above the tray 1001 in the engaged position shown is about 3.0 inches (d30). The nominal diameter of ring 402 is about 6.0 inches. The nominal diameter of ring 403 is about 9.0 inches. The central axis of the post 2 is C2.

Figure 12:
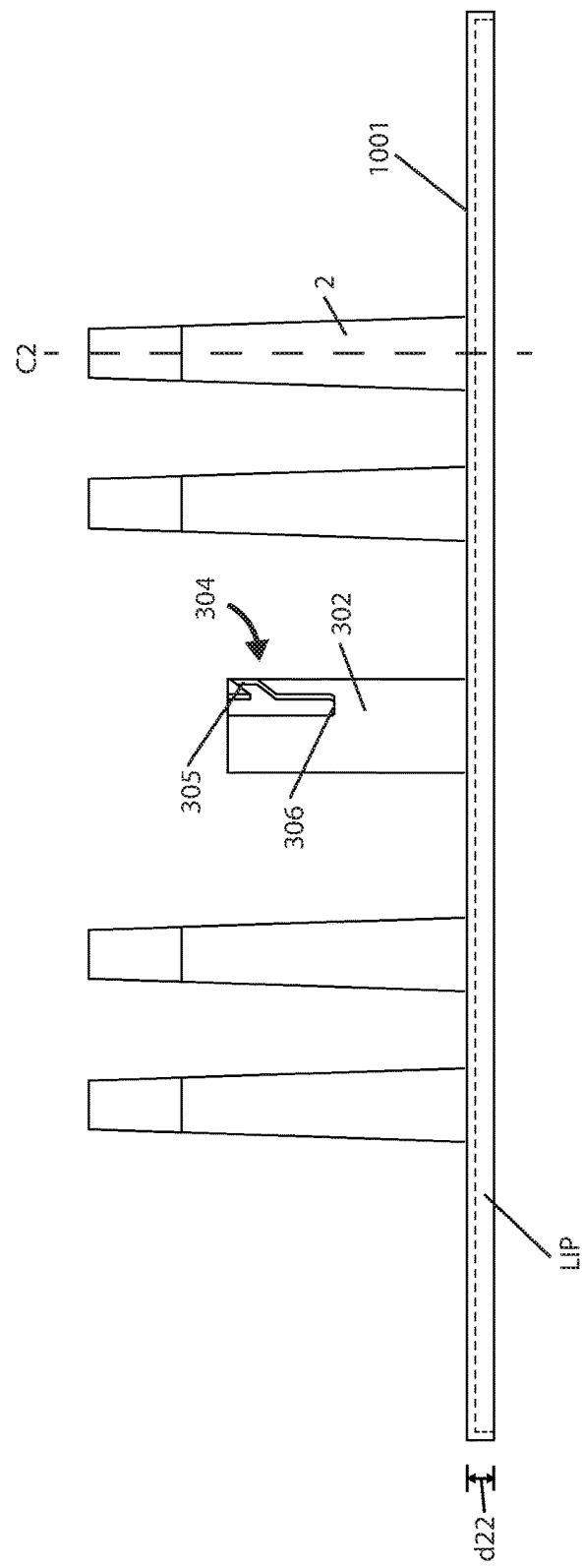
FIG. 12 is a side elevation view of an alternate embodiment tray without any feet.

In FIG. 12 the tray 1001 has no feet. The lip LIP faces down around the periphery to add structural strength.

Nominal dimensions are d45=0.625 inch, d46=0.9 inch, d20=9 inch, d21=1.5 inches, d22=1.5 inches.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:
1. A bagel cookware comprising:
    a metal bagel tray having a plurality of hollow vertical posts to receive a bagel dough ring;
    said bagel tray having a central receiving socket receiving a bottom T bar end of a handle central rod;
    said handle central rod having a top gripper and a monolithic anti-flotation arm; and
    said central receiving socket having a set of vertical slots to receive the bottom T bar end and having a set of retainer channels to secure the T bar end in the retainer channels when the handle central rod is twisted thereby enabling the top gripper to lift the bagel tray;
    wherein a top of the bagel tray and the vertical posts are coated with a non-stick compound;
    wherein the bagel tray has water drain holes adjacent the central receiving socket and adjacent each vertical post; and
    wherein each vertical post is hollow and tapered from a wider bottom to a narrower top, said top being open.
2. The bagel cookware of claim 1, wherein the monolithic anti-flotation arm further comprises an inner and an outer ring mounted on radial arms extending from the handle central rod.
3. The bagel cookware of claim 1, wherein the monolithic anti-flotation arm further comprises a plurality of rectangular wires extending from the handle central rod.

4. The bagel cookware of claim 1, wherein the bagel tray has a downward facing peripheral lip.

5. The bagel cookware of claim 1, wherein the set of retainer channels further comprises an L shaped slot extending partially around the central receiving socket at a bottom of each of the set of vertical slots.

6. The bagel cookware of claim 1, wherein the handle central rod further comprises an anti-rattle washer that engages an inner wall of the central receiving socket.

7. The bagel cookware of claim 1, wherein the bagel tray has a diameter ranging from about 11 inches to about 11.75 inches, and the plurality of vertical posts consists of four posts spaced about 3.5 inches radially from the central receiving socket.

8. A water bagel cookware comprising:
a flat, circular base tray having a hollow central receiving cylinder with a pair of L shaped slots;
wherein a bottom horizontal leg of each slot is receiving a T bar on a bottom end of a central rod of a handle;
wherein rotating the central rod of the handle engages the T bar in the horizontal legs to enable the handle to lift the flat, circular base tray;
a plurality of hollow bagel posts radially spaced from the hollow central receiving cylinder;
said central rod of the handle having a plurality of radial arms that support an anti-flotation structure;
wherein the anti-flotation structure further comprises an inner and an outer ring; and
wherein the central rod of the handle further comprises an anti-wobble washer to engage an inner wall of the central receiving cylinder.

9. The water bagel cookware of claim 8, wherein the flat, circular base tray has a diameter ranging from about 11 inches to about 11.75 inches.

10. The water bagel cookware of claim 9, wherein the plurality of hollow bagel posts consist of four, each radially spaced from the hollow central receiving cylinder.

11. The water bagel cookware of claim 10, wherein a top of the flat, circular base tray and the bagel posts are coated with a non-stick compound, and the flat, circular base tray has a plurality of water drain holes.

12. The water bagel cookware of claim 11, wherein the flat, circular base tray further comprises a downward facing peripheral lip.

13. A circular dough cookware comprising:
a flat, circular base tray having a hollow central receiving cylinder with a pair of L shaped slots;
wherein a bottom horizontal leg of each slot is receiving a T bar on a bottom end of a central rod of a handle;
wherein rotating the central rod of the handle engages the T bar in the horizontal legs to enable the handle to lift the flat, circular base tray;
a plurality of hollow bagel posts radially spaced from the hollow central receiving cylinder;
said central rod of the handle having a plurality of radial arms that support an anti-flotation structure;
wherein the central rod of the handle further comprises an anti-wobble washer to engage an inner wall of the central receiving cylinder;
wherein a top of the base tray and the hollow bagel posts are coated with a non-stick compound;
wherein the base tray has water drain holes; and
wherein each hollow bagel post is tapered from a wider bottom to a narrower top, said top being open.

* * * * *